United States Patent [19]

Schilling

[11] Patent Number: 5,516,826
[45] Date of Patent: May 14, 1996

[54] POLYAMINE CONDENSATES OF STYRENE-ACRYLIC ACID COPOLYMERS AS CORROSION INHIBITORS

[75] Inventor: Peter Schilling, Charleston, S.C.

[73] Assignee: Westvaco Corporation, New York, N.Y.

[21] Appl. No.: 499,113

[22] Filed: Jul. 6, 1995

Related U.S. Application Data

[63] Continuation-in-part of Ser. No. 403,054, Mar. 13, 1995, abandoned.

[51] Int. Cl.⁶ ............................................. C08F 8/32
[52] U.S. Cl. .................... 524/377; 524/386; 524/556; 525/329.9; 525/382
[58] Field of Search ...................... 524/377, 386; 525/329.9

[56] References Cited

U.S. PATENT DOCUMENTS

| | | |
|---|---|---|
| 3,134,759 | 5/1964 | Kirkpatrick et al. . |
| 3,412,024 | 11/1968 | Stanford . |
| 3,494,891 | 2/1970 | McWhorter et al. . |
| 3,549,532 | 12/1970 | Stanford et al. . |
| 3,647,731 | 3/1972 | Clough . |
| 4,010,111 | 3/1977 | Chappell et al. . |
| 4,120,839 | 10/1978 | Emmons et al. . |
| 4,233,193 | 11/1980 | Hochreuter et al. . |
| 4,303,563 | 12/1981 | Emmons et al. . |
| 4,374,737 | 2/1983 | Larson et al. . |
| 4,446,260 | 5/1984 | Woods et al. . |
| 4,526,813 | 7/1985 | Wu . |
| 4,546,160 | 10/1985 | Brand et al. . |
| 4,623,680 | 11/1986 | Azarnia et al. . |
| 4,658,036 | 4/1987 | Schilling . |
| 4,743,388 | 5/1988 | Lege . |
| 4,927,669 | 5/1990 | Knox et al. . |
| 5,026,784 | 6/1991 | Le-Khec . |
| 5,053,151 | 10/1991 | Chung et al. . |
| 5,194,640 | 3/1993 | Cosgrove et al. . |
| 5,208,319 | 5/1993 | Schilling . |
| 5,391,636 | 2/1995 | Schilling . |

*Primary Examiner*—Bernard Lipman
*Attorney, Agent, or Firm*—Daniel B. Reece, IV; Terry B. McDaniel; Richard L. Schmalz

[57] ABSTRACT

Corrosion inhibiting compositions for metals subjected to highly acidic environments may be produced by reacting in a condensation reaction a styrene-acrylic acid copolymer with a polyamine (or combination of polyamines) to produce a polyamidoamine inhibitor. A preferred inhibitor product may be produced by replacing up to 80% of the styrene-acrylic acid copolymer with a member selected from the group consisting of: rosin, $C_{23}$–$C_{24}$ modified rosins, $C_8$–$C_{20}$ fatty acids, $C_{9-C22}$ modified fatty acids, and combinations thereof. These inhibitors exhibit excellent film forming and film persistency characteristics.

6 Claims, No Drawings

POLYAMINE CONDENSATES OF STYRENE-ACRYLIC ACID COPOLYMERS AS CORROSION INHIBITORS

This application is a continuation-in-part of my commonly assigned, U.S. patent application Ser. No. 08/403,054 filed Mar. 13, 1995 now abandoned, entitled "Polyamine Condensates Of Styrene-Acrylic Acid Copolymers As Corrosion Inhibitors."

FIELD OF INVENTION

This invention relates to compositions which inhibit the corrosion of metals. More particularly, this invention relates to compositions which inhibit the corrosive effect of acids on metals and the process for producing the same.

BACKGROUND OF THE INVENTION

Corrosion may be defined as the gradual destruction of a material, usually by means of a chemical process. Inorganic or organic chemicals which prevent or slow-down the rate of destruction are called inhibitors. As corrosion may occur under a variety of environmental conditions, different inhibitors have been developed to provide protection for particular situations.

A number of industrial processes (e.g., dissolving of mineral incrustations and acidizing of oil wells) involve the application of hydrochloric or other acids having the capacity to corrode metal surfaces. It is common, therefore, to employ organic film forming compositions during such applications to inhibit corrosion. These film forming inhibitors function to coat the metallic pipe surfaces, usually via the adsorption of molecular polar groups.

It is the object of this invention to provide an effective corrosion inhibitor exhibiting superior film-forming characteristics under highly acidic environments.

SUMMARY OF THE INVENTION

The object of this invention is met by reacting a styrene-acrylic acid copolymer in a condensation reaction with a polyamine (or combination of polyamines) to produce a polyamidoamine inhibitor product. A preferred inhibitor product may be produced by replacing up to 80% of the styrene-acrylic acid copolymer with a member selected from the group consisting of: rosin, $C_{23}$–$C_{24}$ modified rosins, $C_8$–$C_{20}$ fatty acids, $C_9$–$C_{22}$ modified fatty acids, and combinations thereof.

The corrosion inhibiting effects produced by these products are primarily due to the ability of fatty amines, amidoamines, and imidazolines to form films on metal surfaces. The polymeric nature of these products coupled with the high number of amino-anchoring groups contained in their molecules permit these inhibitors to form protective films exhibiting excellent persistencies on metal surfaces exposed to highly acidic environments. As used herein, the term "highly acidic environments" describe environments having a Ph of 1 or less, and also solutions having a mineral acid concentration of 1–35%.

DESCRIPTION OF THE PREFERRED EMBODIMENT

The composition for inhibiting the corrosion of metals in highly acidic environments comprises the polyamidoamine condensation reaction product of:

(a) 20–80 wt. % of a copolymer formed by reacting 1–99 wt. % of α-methyl styrene in a polymerization reaction with 99–1 wt. % of a member selected from the group consisting of acrylic acid, methacrylic acid, and combinations thereof; with (b) 80–20 wt. % of a polyamine.

The process for producing this corrosion inhibitor first reacts (in a polymerization reaction) (α-methyl)-styrene with a member selected from the group consisting of acrylic acid, methacrylic acid, and combinations thereof to form a styrene-acrylic acid copolymer. This copolymer is subsequently reacted (in a condensation reaction) with a polyamine (or combination of polyamines) to form the polyamidoamine corrosion inhibitor. Such polyamidoamine corrosion inhibitors do not contain any free carboxyl groups. These reactions and the inhibitor reaction product are represented in FIG. 1 below.

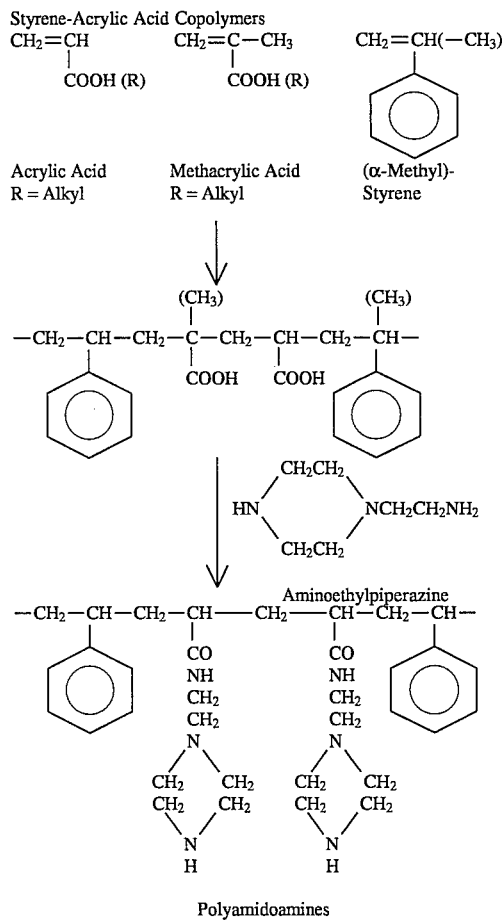

The ratio of (α-methyl)-styrene to acrylic acid (or methacrylic acid) required to yield the desired styrene-acrylic acid copolymers ranges from about 1:1 to 3:1. These copolymers are produced by heating in the presence of a suitable radical initiator the desired mixture of (α-methyl)-styrene and acrylic acid (or methacrylic acid) to a temperature in the range of about 180°–270° C. for a time sufficient for the polymerization reaction to occur (usually about 1 to 20 minutes). (This polymerization reaction is described in U.S. Pat. No. 4,546,160 to Brand et al., which is hereby incorporated by reference.) Styrene-acrylic acid copolymers suitable for the practice of this invention have molecular weights in the range of about 1,000 to 10,000.

The ratio of styrene-acrylic acid copolymer to polyamine required to produce the desired polyamidoamine inhibitor ranges from about 1:1 to 2.5:1. These inhibitors are obtained by heating the desired mixture of styrene-acrylic acid copolymer and polyamine to a temperature in the range of about 180°–260° C. for a time sufficient for the condensation reaction to occur (usually about 2 to 8 hours).

Preferred compositions for inhibiting the corrosion of metals in highly acidic environments comprises the polyamidoamine condensation reaction products of:

(a) 20–80 wt. % of a mixture containing
  (1) 20–80 wt. % of a copolymer formed by reacting 1–99 wt. % of α-methyl styrene reacted in a polymerization reaction with 99–1 wt. % of a member selected from the group consisting of acrylic acid, methacrylic acid, and combinations thereof; and
  (2) 80–20 wt. % of a member selected from the group consisting of rosin, $C_{23}$–$C_{24}$ modified rosins, $C_8$–$C_{20}$ fatty acids, $C_9$–$C_{22}$ modified fatty acids, and combinations thereof; with
(b) 80–20 wt. % of a polyamine.

Such preferred inhibitors (which do not contain any free carboxyl groups) are produced by replacing up to 80% of the styrene-acrylic acid copolymer with a member selected from the group consisting of rosin (i.e. resin acid), $C_{23}$–$C_{24}$ modified rosins, $C_8$–$C_{20}$ fatty acids, $C_9$–$C_{22}$ modified fatty acids, and combinations thereof. Fatty acids which are suitable for the practice of this invention have molecular weights in the range of about 200–350. Sources of such suitable fatty acids include various animal and vegetable oils, glycerides, and tall oil fatty acids. The term "tall oil fatty acid" refers generally to the class of products containing 90% or more fatty acids which are obtained by fractionation of crude tall oil. The fatty acids are primarily a mixture of oleic and linoleic acids, with small amounts of saturated and other unsaturated fatty acids. Common impurities include rosin and neutral materials.

Modified $C_9$–$C_2$ fatty acids suitable for the practice of this invention have molecular weights in the range of about 270–470 and are produced by reacting in a Dieis-Alder reaction polyunsaturated fatty acids (such as linoleic acid) with fumaric acid, maleic anhydride, itaconic acid, methacrylic acid, or acrylic acid to produce cyclic polycarboxylic acids. (This Diels-Alder reaction is described in the commonly assigned U.S. Pat. No. 5,194,640 to Cosgrove et al., which is hereby incorporated by reference).

Rosin suitable for the practice of this invention have molecular weights in the range of about 300–350 and include wood rosin, gum rosin, and tall oil rosin. Modified $C_{23}$–$C_{24}$ rosins suitable for the practice of this invention have molecular weights in the range of about 370–470 and are produced by reacting in a Dieis-Alder reaction rosin with fumaric acid, maleic anhydride, itaconic acid, methacrylic acid, or acrylic acid to produce cyclic polycarboxylic acids. (This Dieis-Alder reaction is described in the commonly assigned, allowed U.S. patent application Ser. No. 07/904,218, U.S. Pat. No. 5,208,319 to Schilling, which is hereby incorporated by reference.)

Polyamines which are suitable for use in the invention have a molecular weight in the range of 60–1,000, and include any amine capable of forming an amidoamine when reacted with a copolymer. These include, but are not limited to, the following: aminoethylethanolamine, aminoethylpiperazine, diethylenetriamine, triethylenetetramine, tetraethylenepentamine, bis-aminopropylamine, pentamethylenediamine, hydroxyethylpiperazine, bis-hexamethylene triamine, higher molecular weight homologs, and combinations thereof.

Radical initiators which are suitable for use in the above polymerization reactions include heat sensitive organic peroxide and azo compounds, and the like.

For application purposes it is preferred to produce corrosion inhibitors which are liquid in form. Therefore, it may be necessary to adjust the viscosity of certain inhibitor formulations by the addition of a solvent (a process well within the ability of a skilled artisan). Solvents which are suitable for this purpose include, but are not limited to, the following: ethylene glycol, diethylene glycol, polyethylene glycol, propylene glycol, and combinations thereof.

The following examples are provided to further illustrate the present invention and are not to be construed as limiting the invention in any manner.

EXAMPLE 1

A polyamidoamine corrosion inhibitor was produced via the following method. To a clean 2 L three-necked flask equipped with a stirrer, thermometer, and reflux condenser with a Dean Stark trap was charged 0.5 parts by weight of a polyamine blend consisting mainly of aminoethylpiperazine and triethylenetetramine and 1.0 parts by weight of diethylene glycol at room temperature. This mixture was heated to 50°–100° C., at which time 0.5 parts by weight of JONCRYL® 678 [an (α-methyl) styrene-acrylic acid copolymer manufactured by S. C. Johnson, Inc.] was slowly added to the flask with stirring. The mixture was heated at 240°–250° C. for six hours before being allowed to cool. The resulting polyamidoamine corrosion inhibiting product is hereafter referred to as CI #1.

EXAMPLE 2

A preferred polyamidoamine corrosion inhibitor was produced via the following method. To a clean 2 L three-necked flask equipped with a stirrer, thermometer, and reflux condenser with a Dean Stark trap was charged 1.0 part by weight of a polyamine blend consisting mainly of aminoethylpiperazine and triethylenetetramine and 1.2 parts by weight of a tall oil fatty acid mixture containing less than 5% rosin. This addition occurred at room temperature and resulted in an exothermic reaction. As soon as the temperature reached 100°–120° C., 0.5 parts by weight of JONCRYL® 680 [an (α-methyl)-styrene-acrylic acid copolymer manufactured by S. C. Johnson, Inc.] was slowly added (with stirring) to the flask. The mixture was heated at 240°–250° C. for six hours before being allowed to cool. The resulting polyamidoamine corrosion inhibiting product is hereafter referred to as CI #4.

EXAMPLE 3

A series of corrosion inhibitors were produced via the methods outlined in Examples 1 and 2 above. The respective weight ratios of ingredients are listed in Table I below.

Corrosion tests were conducted to evaluate the various inhibitors using mild steel (1010) coupons obtained from the Q-Panel Company of Cleveland, Ohio. The weight of each coupon was about 12.5 grams and the surface area was approximately seven square inches (0.1"×3"×1").

In eight-ounce glass bottles with screw caps, 0.1–0.8 g of corrosion inhibitor was dissolved in 200 ml of 15% hydrochloric acid. Weighed mild steel coupons were inserted into the acid and removed from time to time to determine the weight loss. The relative weight loss (%) can be calculated as:

$$\frac{W_o - W}{W_o} \times 100$$

The corrosion rate expressed in lbs/ft$_2$ can be calculated as:

$$(W_o - W) \times 0.03524$$

An untreated steel coupon was utilized as a control. The test results are listed in Table I below.

TABLE I

Evaluation of Corrosion Inhibitors with 1010 Steel in 15% Hydrochloric Acid at 25° C. Dosage: 0.1–0.8 g/200 ml

| Corrosion Inhibitor* | % Weight Loss After | | | | | Dosage, g |
|---|---|---|---|---|---|---|
| | 9 days | 18 days | 37 days | 60 days | 160 days | |
| Control | 16.3 | 37.7 | 87.6 | — | — | 0 |
| CI #1 JONCRYL 678-PA Blend-DEG (0.5:0.5:1) | 3.9 | — | — | 16.3 | — | 0.8 |
| CI #2 JONCRYL 680-PA Blend-DEG (0.5:0.5:1) | 6.1 | — | — | 13.5 | — | 0.8 |
| CI #3 JONCRYL 682-PA Blend-DEG (0.5:0.5:1) | — | — | — | 10.5 | — | 0.8 |
| | — | — | — | 11.2 | — | 0.4 |
| | — | — | — | 11.9 | — | 0.2 |
| | — | — | — | 11.5 | — | 0.1 |
| CI #4 TOFA-JONCRYL 680-PA Blend (1.2:0.3:1) | 3.2 | — | — | 7.8 | — | 0.8 |
| CI #5 ROSIN S-JONCRYL 680-PA Blend (1.2:0.3:1) | — | — | — | 8.9 | — | 0.8 |
| | — | — | — | 8.9 | — | 0.2 |
| CI #6 TOFA-JONCRYL 680-DETA (1.2:0.3:1) | — | — | — | — | 6.4 | 0.8 |
| | — | — | — | — | 9.8 | 0.4 |
| | — | — | — | — | 13.9 | 0.2 |
| | — | — | — | — | 14.9 | 0.1 |
| CI #7 TOFA-PA Blend (1.5:1) | — | 5.3 | — | 13.7 | — | 0.8 |
| CI #8 MOREZ 100-PA Blend-DEG (0.5:0.5:1) | — | — | — | 16.0 | — | 0.8 |
| CI #9 MOREZ 300-PA Blend-DEG (0.5:0.5:1) | — | — | — | 16.0 | — | 0.8 |
| CI #10 MOREZ 300-DETA (1:2) | — | — | — | 11.9 | — | 0.8 |
| CI #11 FuTO-JONCRYL 680-PA Blend (0.8:0.4:1.2) | — | — | — | 9.0 | — | 0.8 |
| CI #12 AcTO-JONCRYL 680-PA Blend (0.8:0.4:1.2) | — | — | — | 7.5 | — | 0.8 |

*AcTo: acrylated tall oil fatty acid.
DEG: diethylene glycol.
DETA: diethylene triamine.
FuTO: Fumarated tall oil fatty acid.
JONCRYL ® 678, 680, 682: (α-methyl)-styrene-acrylic acid copolymers manufactured by S. C. Johnson, Inc.
TOFA: a tall oil fatty acid mixture containing less than 5% rosin.
MOREZ ® 100, 300: (α-methyl)-styrene-acrylic acid copolymers manufactured by Morton International, Inc.
PA Blend: a polyamine blend consisting mainly of aminoethylpiperazine and triethylenetetramine.
ROSIN S: a tall oil rosin manufactured by Westvaco, Inc.

In the first series of inhibitors, (α-methyl)-styrene-acrylic acid copolymers (i.e., JONCRYL®, MOREZ®) having differing molecular weights were reacted with polyamines. In this series diethylene glycol was utilized as a solvent to reduce the viscosity of the final polyamidoamine products. As Table I shows, the best performance was obtained with the PA Blend condensates of the lower molecular weight resins, JONCRYL 682 and MOREZ 300. After 60 days exposure, the weight loss of the steel coupon was 10.5% and 10.8% versus 13.7% for the same dosage of the TOFA-PA Blend (1.5:1)-condensate.

Improved products were obtained with blends of rosin, tall oil fatty acids, tall oil fatty acids modified with acrylic acid or fumaric acid, and (α-methyl)-styrene-acrylic acid copolymers (i.e., JONCRYL 680) reacted with DETA and the PA Blend. Products prepared from such blends containing 20% to 33% (α-methyl)-styrene-acrylic acid copolymers lowered the weight losses to 7.5–9.0% after 60 days (PA Blend) and 6.4% after 160 days (DETA).

EXAMPLE 4

As a comparative study, a series of compounds were made by following the methods taught in Examples 1, 2, and 5 of U.S. Pat. No. 3,134,759 to Kirkpatrick et al. (which is hereby incorporated by reference). (Hereafter the series of compounds are referred to as Compounds 1, 2, and 5, respectively.) Each compound was evaluated using the same corrosion testing procedures employed in Example 3 above.

The compounds taught by Kirkpatrick et al. contain at least one free carboxyl group and are not acid-soluble. Thus, when placed in highly acidic environments these compounds formed (for the lack of a better term) suspended glops. Indeed, Compound 5 polymerized to such an extent that no effective measurements could be taken. The coupon in the bottle containing Compound 1 corroded at a rate of 0.383 wt. % per day (a 61.24 wt. % loss after 160 days). The coupon in the bottle containing 0.8% Compound 2 corroded at a rate of 0,434 wt. % per day (a 69.44 wt. % loss after 160 days). The coupon in the bottle containing 1.6% Compound 2 corroded at a rate of 0,326 wt. % per day (a 52.16 wt. loss after 160 days).

It is clear that the novel corrosion inhibiting compositions taught herein achieved superior results when compared to the patented corrosion inhibitors.

Although in the above examples the various corrosion inhibitors were formulated for, and tested in, highly acidic environments, it should be noted that these novel inhibitors will also prevent corrosion when utilized in other, less strenuous, environments. Indeed, many modifications and variations of the present invention will be apparent to one of ordinary skill in the art in light of the above teaching. It is understood therefore that the scope of the invention is not to be limited by the foregoing description, but rather is to be defined by the claims appended hereto.

What is claimed is:

1. A composition for inhibiting the corrosion of metals in highly acidic environments comprising the polyamidoamine condensation reaction product of:

(a) 20–80 wt. % of a copolymer formed by reacting 1–99 wt. % of α-methyl styrene in a polymerization reaction with 99–1 wt. % of a member selected from the group consisting of acrylic acid, methacrylic acid, and combinations thereof; with (b) 80–20 wt. % of a polyamine.

2. The composition of claim 1 comprising the polyamidoamine condensation reaction product of: (a) 30–70 wt. % of a copolymer formed by reacting 20–80 wt. % of α-methyl styrene in a polymerization reaction with 80–20 wt. % of a member selected from the group consisting of acrylic acid, methacrylic acid, and combinations thereof; with (b) 70–30 wt. % of a polyamine.

3. The composition of claim 1 wherein the copolymer has a molecular weight in the range of 500–1,000.

4. The composition of claim 1 wherein the polyamine has a molecular weight in the range of 60–1,000.

5. The composition of claim 1 wherein the polyamine is selected from the group consisting of aminoethylethanolamine, aminoethylpiperazine, diethylenetriamine, triethylenetetramine, tetraethylenepentamine, bis-aminopropylamine, pentamethylenediamine, hydroxyethylpiperazine, bis-hexamethylenetriamine, homologs, and combinations thereof.

6. The composition of claim 1 dispersed in a solvent selected from the group consisting of ethylene glycol, diethylene glycol, polyethylene glycol, propylene glycol, and combinations thereof.

* * * * *